(12) United States Patent
Futamata (10) Patent No.: US 12,084,141 B2
(45) Date of Patent: Sep. 10, 2024

(54) METER STRUCTURE

(71) Applicant: HONDA MOTOR CO., LTD., Tokyo (JP)

(72) Inventor: Takeshi Futamata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/263,209

(22) PCT Filed: Dec. 20, 2021

(86) PCT No.: PCT/JP2021/047086
§ 371 (c)(1),
(2) Date: Jul. 27, 2023

(87) PCT Pub. No.: WO2022/176371
PCT Pub. Date: Aug. 25, 2022

(65) Prior Publication Data
US 2024/0116591 A1    Apr. 11, 2024

(30) Foreign Application Priority Data

Feb. 16, 2021 (JP) .................. 2021-022550

(51) Int. Cl.
*B62J 50/22* (2020.01)
*B62J 6/055* (2020.01)
*B62J 6/24* (2020.01)

(52) U.S. Cl.
CPC .............. *B62J 50/22* (2020.02); *B62J 6/24* (2020.02); *B62J 6/055* (2020.02)

(58) Field of Classification Search
CPC ............... B62J 50/22; B62J 6/24; B62J 6/055

USPC ........................................... 362/473
See application file for complete search history.

(56) References Cited

U.S. PATENT DOCUMENTS

| 7,714,704 | B1 * | 5/2010 | Mellen ............. | B62J 43/30 |
| | | | | 340/432 |
| 2020/0307604 | A1 | 10/2020 | Morita et al. | |
| 2021/0039737 | A1 * | 2/2021 | Montez ............ | H04N 23/90 |

FOREIGN PATENT DOCUMENTS

| DE | 10147283 A1 * | 4/2003 | ............. B62J 6/02 |
| JP | H10-250413 A | 9/1998 | |
| JP | 2007-033268 A | 2/2007 | |
| JP | 5650623 B2 | 1/2015 | |
| JP | 2018-507816 A | 3/2018 | |
| JP | 2020-163922 A | 10/2020 | |
| WO | 2016/144269 A1 | 9/2016 | |

OTHER PUBLICATIONS

International Search Report, International Application No. PCT/JP2021/047086, Date of mailing: Feb. 22, 2022, 2 pages.
Written Opinion of the International Searching Authority dated Feb. 22, 2022 filed in PCT/JP2021/047086, 3 pages.
English translation of the International Preliminary Report on Patentability dated Aug. 31, 2023 issued in corresponding International application No. PCT/JP2021/047086; (5 pages).

* cited by examiner

*Primary Examiner* — Laura K Tso
(74) *Attorney, Agent, or Firm* — Rankin, Hill & Clark LLP (57) ABSTRACT

A meter structure in which reduction in dimension of a display part can be attained and displays of indicators can be easily seen. The meter structure includes: a meter device provided with a display part; and a light source for indicators on an outer-peripheral side surface of the meter device.

8 Claims, 7 Drawing Sheets

METER STRUCTURE

TECHNICAL FIELD

The present invention relates to a meter structure.

BACKGROUND ART

Patent Literature 1 describes a meter device of a saddled vehicle, which indicates an engine RPM and a vehicle speed. In the meter device described in Patent Literature 1, an indicator, a direction display section, and the others are arranged adjacent to an engine tachometer, and various information is visually recognized from a display part of the meter device, that is, from a meter lens that covers the front side of a meter housing in Patent Literature 1.

CITATION LIST

Patent Literature

Patent Literature 1
Japanese Patent No. 5650623

SUMMARY OF INVENTION

Technical Problem

Nonetheless, since the technique described in Patent Literature 1 has a structure in which the engine RPM, the direction display section, and others are arranged in the display part, the amount of information in the display part might become excessive and various information might become difficult to be seen. In particular, when the display part is constituted by a display screen on which images are displayed, three-dimensional segments are likely to be lost, and there is also a risk of causing confusion with the other displays.

An object of the present invention, which has been made in light of the above-described circumstances, is to provide a meter structure in which reduction in dimension of a display part can be attained and displays of indicators can be easily seen.

Solution to Problem

The present specification includes all the contents of Japanese Patent Application No. 2021-022550 filed on Feb. 16, 2021.

A meter structure is characterized by including: a meter device provided with a display part; and a light source for an indicator on an outer-peripheral side surface of the meter device.

In the above configuration, the meter device may be a meter display.

In the above configuration, a wall body may be located with a predetermined gap from the light source, and a light emitted by the light source may be reflected on the wall body.

In the above configuration, a support body that supports the meter display may be provided, and the wall body may be a part of the support body.

In the above configuration, the outer-peripheral side surface may be provided with a cutout corresponding to an arrangement position of the light source.

In the above configuration, the wall body may have a height in a thickness direction of the meter display, and the height of the wall body may be lower than that of the meter display.

In the above configuration, in the thickness direction of the meter display, the height of the wall body may be lower than a height of the cutout.

In the above configuration, the light source may include a first light source, and the first light source may be paired on the left and right and may correspond to respective operations of left and right blinkers.

In the above configuration, the light source may include a second light source, and the second light source may be located on an upper outer-peripheral side surface of the meter device and may correspond to a gear position.

In the above configuration, the second light source may be lit up in different colors depending on the gear position.

Advantageous Effects of Invention

The meter structure includes: a meter device provided with a display part; and a light source for an indicator on an outer-peripheral side surface of the meter device. According to this configuration, it is unnecessary to provide the indicator in the display part, and the display screen can be reduced in dimension as well as the display of the indicator can be made easier to be seen.

In the above configuration, the meter device may be a meter display. According to this configuration, the indicator can be represented outside the display screen of the meter display and thereby the display of the indicator can be easier to be seen, compared with the case of displaying the indicator on the display screen of the meter display having no three-dimensional segments.

In the above configuration, a wall body may be located with a predetermined gap from the light source, and a light emitted by the light source may be reflected on the wall body. According to this configuration, the display of the indicator can be made easier to be seen. In addition, the wall body hinders the light of the indicator from being seen from the front, left, and right sides of the saddled vehicle.

In the above configuration, a support body that supports the meter display may be provided, and the wall body may be a part of the support body. According to this configuration, since the support body integrally includes the wall body, the number of components can be reduced.

In the above configuration, the outer-peripheral side surface may be provided with a cutout corresponding to an arrangement position of the light source. According to this configuration, the light of the indicator, which is propagating toward the front side of the display screen of the meter display, is suppressed from being blocked by the outer-peripheral side surface, which can make the display of the indicator easier to be seen.

In the above configuration, the wall body may have a height in a thickness direction of the meter display, and the height of the wall body may be lower than that of the meter display. According to this configuration, the light of the indicator can easily leak toward the periphery of the wall body to facilitate illumination of the surroundings, and the display of the indicator can be easily recognized.

In the above configuration, in the thickness direction of the meter display, the height of the wall body may be lower than a height of the cutout. According to this configuration, by balancing the amount of the light of the indicator leaking toward the periphery of the wall body with the amount of the light of the indicator propagating toward the front side of the display screen of the meter display, it is possible to make the display of indicator easier to be seen.

In the above configuration, the light source may include a first light source, and the first light source may be paired on the left and right and may correspond to respective operations of left and right blinkers. According to this configuration, the operating state of the blinker can be displayed by the indicator.

In the above configuration, the light source may include a second light source, and the second light source may be located on an upper outer-peripheral side surface of the meter device and may correspond to a gear position. According to this configuration, the state of the gear position can be displayed by the indicator.

In the above configuration, the second light source may be lit up in different colors depending on the gear position. According to this configuration, the state of the gear position can be displayed by the indicator based on the lighting color of the second light source.

DESCRIPTION OF EMBODIMENTS

One embodiment of the present invention will be described below with reference to the drawings. In the description, directions such as front, back, left, right, up, and down are the same as directions relative to a vehicle body unless otherwise specified. Further, the symbol FR shown in each drawing indicates the frontward direction of the vehicle body, the symbol UP indicates the upward direction of the vehicle body, and the symbol LH indicates the leftward direction of the vehicle body.

EMBODIMENT

Figure 1:
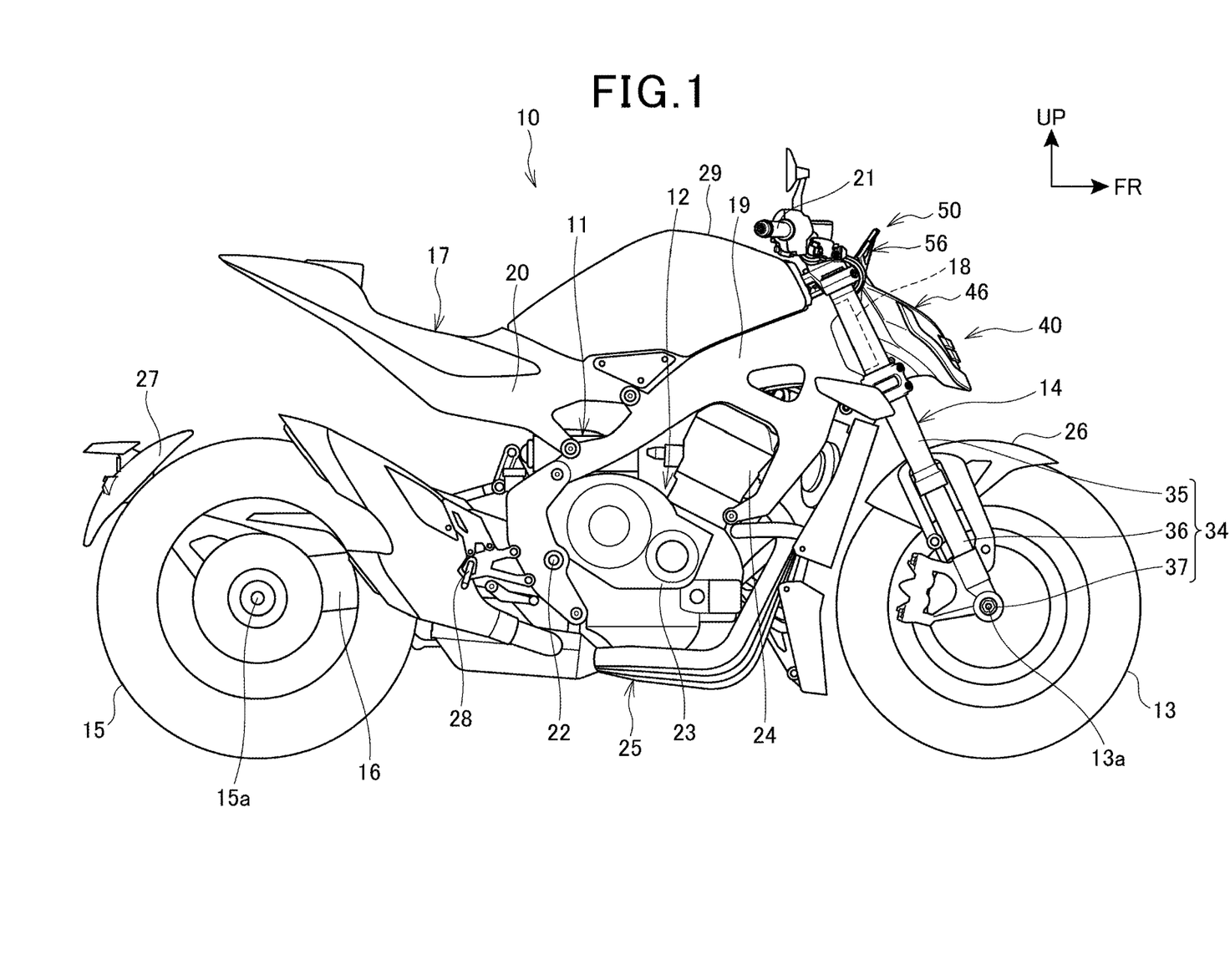
FIG. 1 is a side view of a saddled vehicle according to an embodiment of the present invention.

FIG. 1 is a side view of a saddled vehicle 10 according to the embodiment of the invention.

The saddled vehicle 10 is a vehicle including: a vehicle body frame 11; a power unit 12 supported by the vehicle body frame 11; front forks 14 steerably supporting a front wheel 13; a swing arm 16 that supports a rear wheel 15; and a seat 17 for an occupant.

The saddled vehicle 10 is a vehicle in which the occupant sits astride the seat 17. The seat 17 is provided above the rear part of the vehicle body frame 11.

The vehicle body frame 11 includes: head pipes 18 provided to a front end part of the vehicle body frame 11; a front frame 19 located behind the head pipes 18; and a rear frame 20 located behind the front frame 19. The front end part of the front frame 19 is connected to the head pipes 18.

The seat 17 is supported by the rear frame 20.

The front forks 14 are supported by the head pipes 18 so as to be steerable to the left and right. The front wheel 13 is supported by an axle 13a provided to the lower end parts of the front forks 14. A handle 21 for steering held by the occupant is attached to the upper end parts of the front forks 14.

The swing arm 16 is supported by a pivot axis 22 supported by the vehicle body frame 11. The pivot axis 22 is an axis extending horizontally in the vehicle width direction. The pivot axis 22 is inserted through the front end part of the swing arm 16. The swing arm 16 swings up and down around the pivot axis 22.

The rear wheel 15 is supported by an axle 15a provided to the rear end part of the swing arm 16.

The power unit 12 is located between the front wheel 13 and the rear wheel 15 and is supported by the vehicle body frame 11.

The power unit 12 is an internal combustion engine. The power unit 12 includes: a crankcase 23; and a cylinder part 24 that accommodates reciprocating piston or pistons. An exhaust system 25 is connected to an exhaust port of the cylinder part 24.

The output of the power unit 12 is transmitted to the rear wheel 15 by a driving force transmission member that connects the power unit 12 to the rear wheel 15.

In addition, the saddled vehicle 10 includes: a front fender 26 that covers the front wheel 13 from above; a rear fender 27 that covers the rear wheel 15 from above; steps 28 on which the occupant puts his or her feet; and a fuel tank 29 that stores fuel used by the power unit 12.

The front fender 26 is attached to the front forks 14. The rear fender 27 and the steps 28 are disposed below the seat 17. The fuel tank 29 is supported by the vehicle body frame 11.

Figure 2:
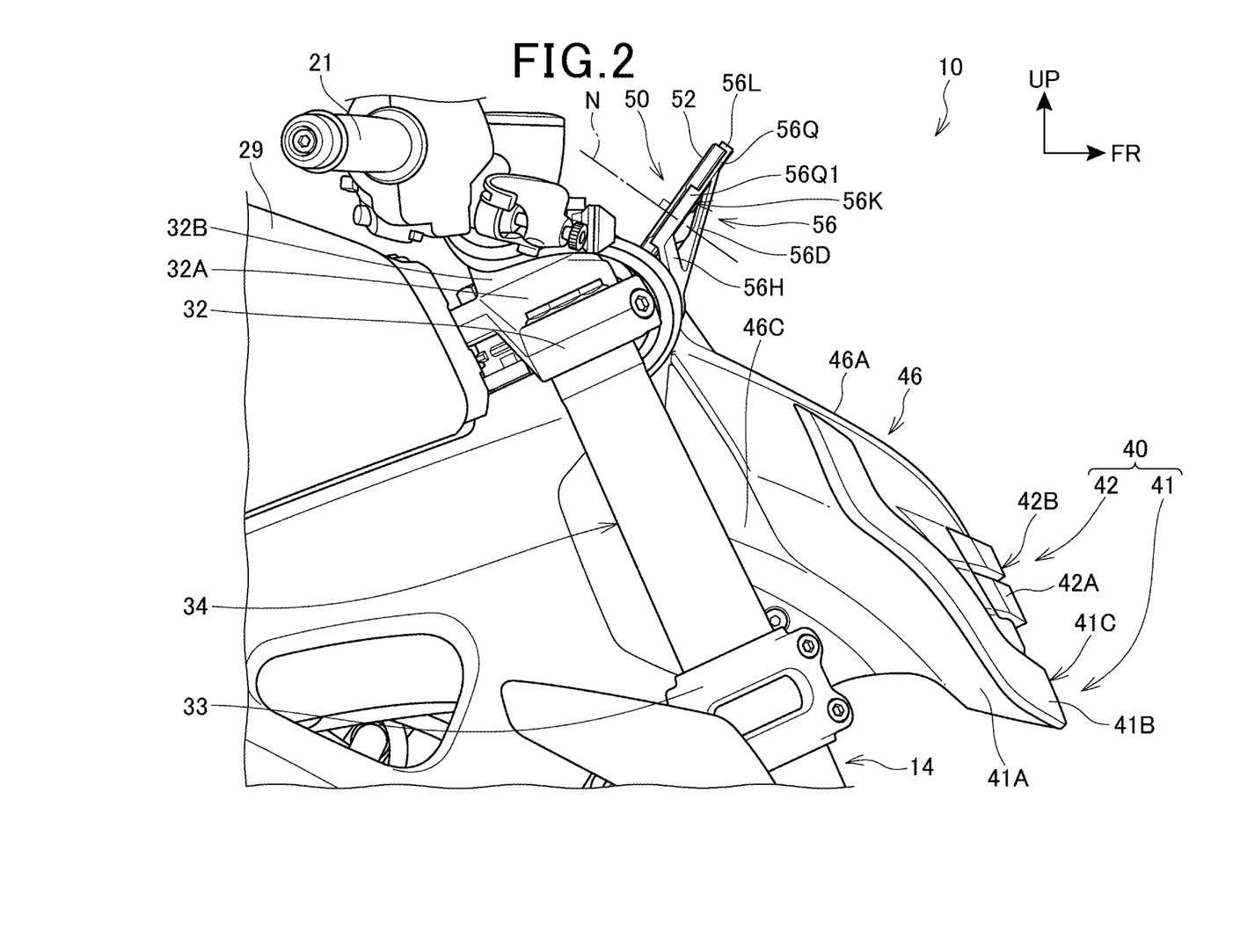
FIG. 2 is a right side view showing the periphery of a headlight of the saddled vehicle according to the embodiment of the present invention.
Figure 3:
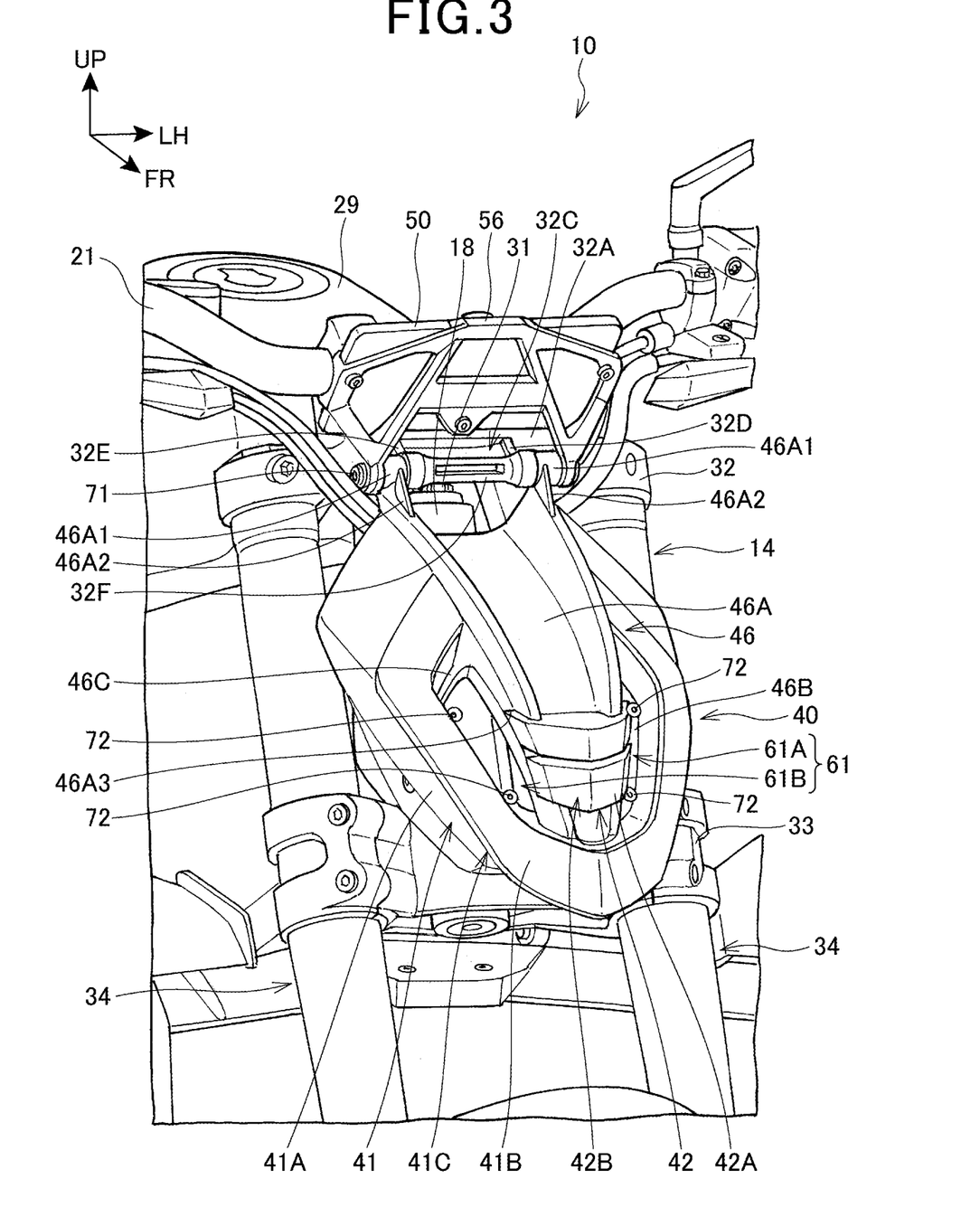
FIG. 3 is a perspective view, as viewed from the right front, of the periphery of the headlight of the saddled vehicle according to the embodiment of the present invention.

FIG. 2 is a right side view showing the periphery of the headlight 40 of the saddled vehicle 10 according to the embodiment of the present invention. FIG. 3 is a perspective view, viewed from the right front, showing the periphery of the headlight 40 of the saddled vehicle 10 according to the embodiment of the present invention.

The saddled vehicle 10 includes: the headlight 40; and a meter display (meter device) 50. The headlight 40 is supported by the front forks 14 via a headlight stay 46. The meter display 50 is supported by the front forks 14 via a meter stay 56.

The front forks 14 include a steering shaft 31 (see FIG. 3) rotatably supported by the head pipe 18. A top bridge 32 extending in the left-right direction (vehicle width direction) is fixed to an upper end of the steering shaft 31. A bottom bridge 33 extending in the left-right direction is fixed to the lower end of the steering shaft 31. A pair of left and right fork tubes 34 extending in the up-down direction is supported by the top bridge 32 and the bottom bridge 33. As shown in FIG. 1, each fork tube 34 is tilted rearward with respect to the up-down direction (vertical direction) by the caster angle set for the saddled vehicle 10.

The fork tube 34 of the present embodiment includes: an upper tube 35 configuring the upper part thereof; a lower tube 36 slidably fitted into the upper tube 35; and an axle support member 37 fixed to the lower end part of the lower tube 36. The axle 13a is supported by the axle support member 37. The lower tube 36 configures the lower part of the fork tube 34.

The steering shaft 31, the top bridge 32, the bottom bridge 33, and the pair of left and right fork tubes 34 configure the front forks 14 of the present embodiment.

The top bridge 32 includes a top bridge body 32A extending in the vehicle width direction. The fork tubes 34 are fixed respectively to both left and right ends of the top bridge body 32A. A handle stem 32B (see FIG. 2, etc.) projecting upward is provided to the center part in the left-right direction of the top bridge body 32A. The handle 21 extending in the left-right direction is fixed to the handle stem 32B.

As shown in FIG. 3, a bridge stay 32C is formed at the front part of the top bridge body 32A. The bridge stay 32C includes a pair of left and right stay legs 32D, 32E projecting frontward from the top bridge body 32A. A columnar fastening part 32F extending in the left-right direction is supported at front ends of the stay legs 32D, 32E. A pair of left and right fastening members 71 extending in the left-right direction is fastened to the fastening part 32F from the left-right direction so as to fasten the headlight stay 46 and the meter stay 56 together. The fastening members 71 are bolts, for example.

The headlight stay 46 of the present embodiment is a metal stay. The headlight stay 46 includes a center part (stay part) 46A extending downward from the bridge stay 32C. The center part 46A is formed to have a U-shaped cross section. The center part 46A is tapered and becomes narrower toward the lower end side (tip end side) in a front view. The center part 46A is curved in an upwardly convex shape and extends downward in a side view (see FIG. 2).

The center part 46A is formed with a pair of left and right fixing parts 46A1 corresponding to the U-shaped upper ends of the center part 46A. The fixing parts 46A1 are each formed in a cylindrical shape extending in the left-right direction. A reinforcement piece 46A2 projecting frontward and upward is formed on the outer periphery of each fixing part 46A1.

The fixing parts 46A1 are arranged on the left and right of the bridge stay 32C, and the fastening members 71 are inserted through these fixing parts from the left-right direction, which are supported by the fastening part 32F.

The lower part of the center part 46A is formed with a lamp holding part 46A3 having a cutout shape cutout from frontward to rearward.

A pair of left and right side parts 46B, 46C are provided on the left and right of the center part 46A. The side parts 46B, 46C are connected to the center part 46A at an upper part from the lamp holding part 46A3. The side part 46B on the left and the side part 46C on the right are formed symmetrically to each other.

The side parts 46B, 46C project outward in the left-right direction from the rear part of the center part 46A in a front view, and extends downward while being curved convexly in the left-right direction toward the center part in the left-right direction.

An intake port 61 that takes in traveling wind to be sent to the power unit 12 is formed between the center part 46A, and the left side part 46B and the right side part 46C. The intake port 61 is formed by an enclosing shape defined by the center part 46A, and the left side part 46B and the right side part 46C. The intake port 61 is split left and right by the center part 46A, and includes a left intake port 61A and a right intake port 61B.

A DRL (first lamp) 41 is arranged on the outer peripheral side of the intake port 61. The DRL 41 is arranged on the front face of the side parts 46B, 46C. The DRL is an abbreviation for a daytime running light. The DRL 41 includes a housing 41A made of resin, a not-shown light emitter accommodated in the housing 41A, and a lens 41B that transmits light from the light emitter. The light emitter of the DRL 41 includes, for example, a not-shown light source body and a not-shown light guide member that guides the light of the light source body. In the DRL 41, the light emitter emits the light and thereby the lens 41B appears to emit the light. A light-emitting part 41C of the present embodiment is constituted by the not-shown light emitter and the lens 41B.

In the DRL 41, the housing 41A is fixed with fastening members 72 to portions of the side parts 46B, 46C corresponding to the outer periphery of the intake port 61. The DRL 41 extends along the outer periphery of the intake port 61.

A beam light (second lamp) 42 is arranged inside the enclosing shape of the DRL 41. The beam light 42 functions as a high beam light and a low beam light. The beam light 42 is arranged at a lower position in the region surrounded by the DRL 41. The beam light 42 is supported by the lamp holding part 46A3 (see FIG. 3) of the headlight stay 46. The beam light 42 includes a not-shown light emitter; and a lens 42A that transmits light from the light emitter. The light emitter of the beam light 42 is constituted by, for example, a not-shown light source body, and a not-shown reflector that reflects the light of the light source body. In the beam light 42, the light emitter emits the light and thereby the lens 42A appears to emit the light. The light-emitting part 42B of the present embodiment is constituted by the not-shown light emitter and the lens 42A.

The headlight 40 of the present embodiment is constituted by the DRL 41 and the beam light 42. The headlight 40 is arranged frontward of the fork tubes 34 of the front forks 14.

Figure 4:
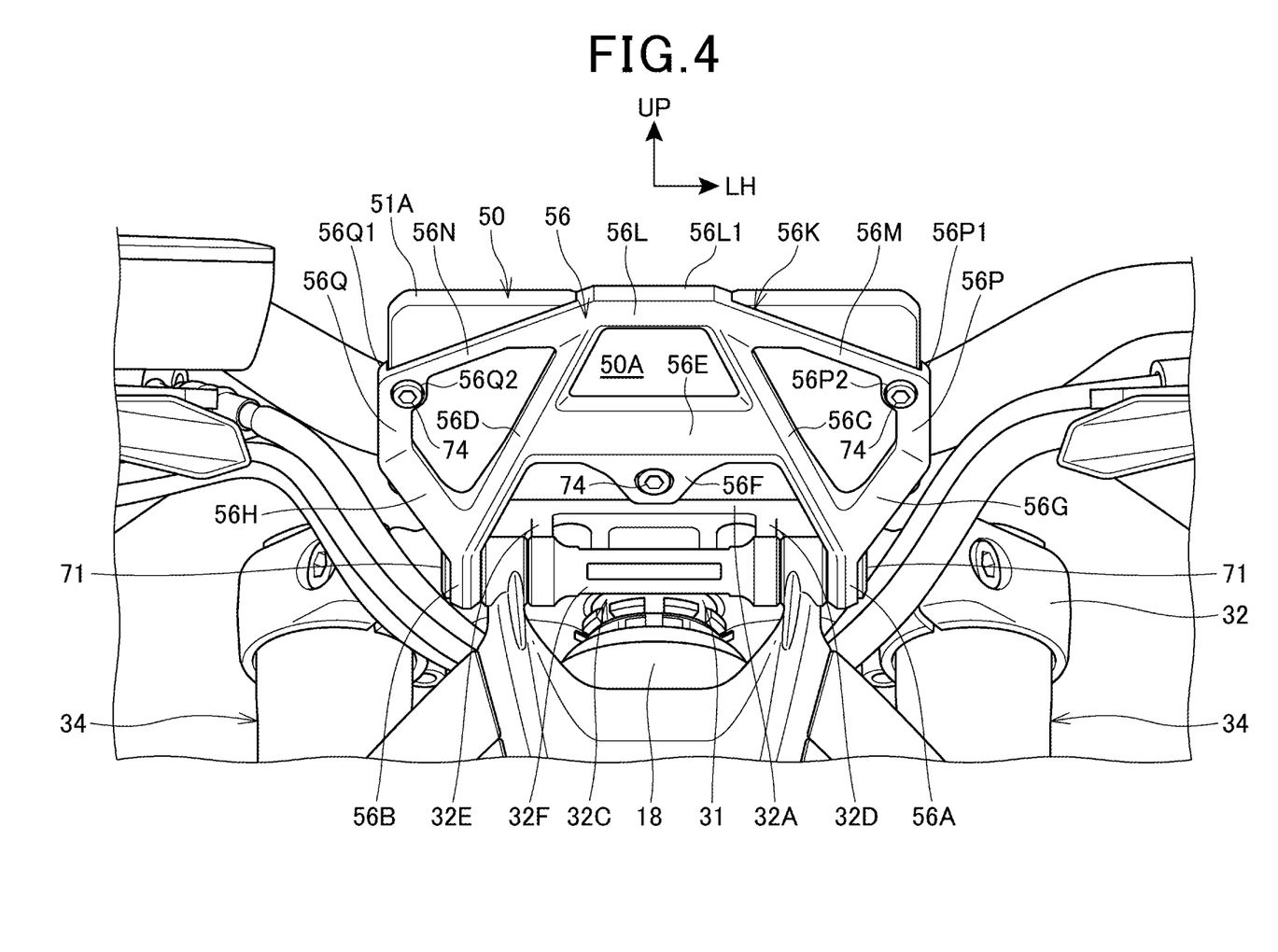
FIG. 4 is a front view showing the periphery of a meter stay of the saddled vehicle according to the embodiment of the present invention.

FIG. 4 is a front view showing the periphery of the meter stay 56 of the saddled vehicle 10 according to the embodiment of the present invention.

Above the headlight 40, a horizontally long rectangular plate-like meter display 50 is arranged. The meter display 50 is supported by the meter stay (support body) 56.

The meter stay 56 is a metal stay. The meter stay 56 of the present embodiment is made of aluminum. The meter stay 56 is formed symmetrically. The meter stay 56 includes a pair of left and right base parts 56A, 56B at the lower part thereof. The base parts 56A, 56B are each formed in a cylindrical shape extending in the left-right direction. The left base part 56A is located on the left of the left fixing part 46A1 of the headlight stay 46, and the right base part 56B is located on the right of the right fixing part 46A1 of the headlight stay 46. The base parts 56A, 56B are inserted into the bridge stay 32C from the left and right by a pair of left and right fastening members 71 and are supported while being fastened together with the headlight stay 46. The meter stay 56 is configured to be rotatable around the fastening members 71 against the frictional force. That is, the rotation angle around the fastening members 71 of the meter stay 56 is held by the frictional force. By adjusting the rotation angle of the meter stay 56, the inclination angle of the meter display 50 can be adjusted in accordance with a driver who is the occupant.

First extension parts 56C, 56D extending upward (radially) are formed on the outer peripheral surfaces of the base parts 56A, 56B. The first extension parts 56C, 56D are inclined inward in the left-right direction toward upward. A connecting part 56E extending in the left and right direction is formed between the first extension part 56C on the left and the first extension part 56D on the right. A center fixing part 56F is formed at the center position in the left-right direction of the connecting part 56E. The center fixing part 56F extends in a flat plate-like shape projecting rearward from the connecting part 56E.

Second extension parts 56G, 56H are formed on the outer peripheral surfaces of the base parts 56A, 56B, the second extension parts 56G, 56H extending while branching upward (radially) from outward in the left-right direction of the first extension parts 56C, 56D. The second extension parts 56G, 56H are inclined outward in the left-right direction toward upward.

A mounting part 56K formed in a square frame-like and inverted U-shape is formed at the upper ends (tip ends) of the first extension parts 56C, 56D and the second extension parts 56G, 56H.

The upper end of the mounting part 56K is formed with an upper mounting part 56L formed in a long plate-like shape and extending in the left-right direction. The upper mounting part 56L is supported at its outer ends in the left-right direction by the upper ends of the first extension parts 56C, 56D. The upper end of the upper mounting part 56L is formed with an upper wall body 56L1 that projects upwardly rearward from the upper mounting part 56L. The upper wall body 56L1 extends along the upper mounting part 56L. The upper mounting part 56L and the upper wall body 56L1 are formed to have an L-shaped cross section as a whole.

The outer ends in the left-right direction of the upper mounting part 56L are formed with long plate-like inclined mounting parts 56M, 56N that are inclined downward toward outward in the left-right direction. The outer ends in the left-right direction of the inclined mounting parts 56M, 56N are formed with long plate-like side mounting parts 56P, 56Q that extend downward. The side mounting parts 56P, 56Q are supported at their lower ends by the upper ends of the second extension parts 56G, 56H.

The outer ends in the left-right direction of the side mounting parts 56P, 56Q are formed with side wall bodies 56P1, 56Q1 that project rearwardly upward from the side mounting parts 56P, 56Q. The side wall bodies 56P1, 56Q1 extend along the side mounting parts 56P, 56Q. The side mounting parts 56P, 56Q and the side wall bodies 56P1, 56Q1 are each formed to have an L-shaped cross section, as a whole.

The upper ends of the side mounting parts 56P, 56Q are formed with side fixing parts 56P2, 56Q2.

The mounting part 56K is constituted by the upper mounting part 56L, the inclined mounting parts 56M, 56N, and the side mounting parts 56P, 56Q. The mounting part 56K is formed in a frame-like shape with a surface along a back surface 50A of the meter display 50. The mounting part 56K is bent frontward, as shown in FIG. 2, with respect to the extending direction of the first extension parts 56C, 56D and the second extension parts 56G, 56H.

The meter display 50 is placed on the mounting part 56K. The meter display 50 is placed such that its outer-peripheral side surface 51A extends along the upper wall body 56L1, the left side wall body 56P1, and the right side wall body 56Q1, as shown in FIG. 4. The meter display 50 is fastened with fastening members 74 that are inserted through the center fixing part 56F, the left side fixing part 56P2, and the right side fixing part 56Q2. That is, the meter display 50 is fixed to the meter stay 56 by fastening the fastening members 74 into not-shown fastening holes in the back surface 50A of the meter display 50.

When the meter display 50 is assembled to the meter stay 56, it is facilitated to adjust the position of the meter display 50 relative to the meter stay 56 with reference to the upper wall body 56L1, the left side wall body 56P1, and the right side wall body 56Q1.

Figure 5:
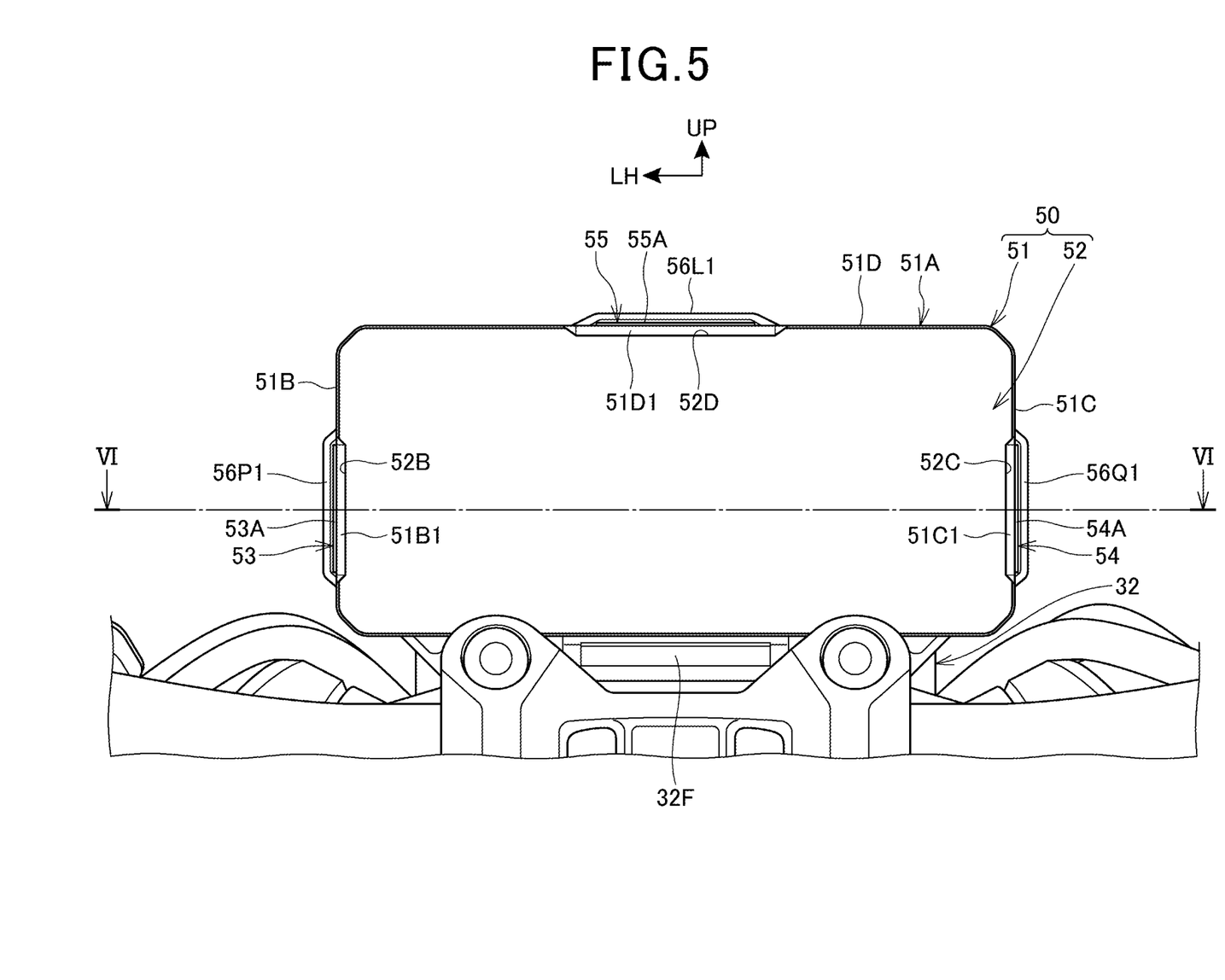
FIG. 5 is a view of a meter display, as viewed from a display screen side.

FIG. 5 is a view of the meter display 50, as viewed from the display screen 52 side.

The meter display 50 is a so-called tablet-type information display terminal. The meter display 50 includes: a cover 51 formed in a flat disk-like shape; a not-shown controller housed in the cover 51; and a display screen (display part) 52 that displays an image processed by the controller. As shown in FIG. 2, a normal direction N of the display screen 52 corresponds to the thickness direction of the meter display 50. An engine RPM, a vehicle speed, and the others are displayed on the display screen 52.

The meter display 50 is connected to a not-shown ECU and is controlled by the ECU through wireless communication. The ECU is an abbreviation for an electronic control unit. The meter display 50 and the ECU may be connected to each other via a cable instead of wireless communication or may be controlled by the ECU through wired communication between the meter display 50 and the ECU.

The outer-peripheral side surface 51A of the cover 51 of the meter display 50 is provided with a plurality of indicators (light sources for indicators) 53, 54, 55.

Specifically, in the outer-peripheral side surface 51A of the meter display 50, a left outer-peripheral side surface 51B is provided with the blinker indicator (a light source for an indicator, a first light source) 53. A right outer-peripheral side surface 51C is provided with the blinker indicator (a light source for an indicator, the first light source) 54.

That is, the blinker indicators 53, 54 are paired on the left and right. The blinker indicators 53, 54 project outward in the left-right direction from the outer-peripheral side surfaces 51B, 51C. The blinker indicators 53, 54 include not-shown light source bodies and lens cover parts 53A, 54A that cover the light source bodies and transmit lights of the light source bodies. Each light source body is constituted by an LED, for example. The LED is an abbreviation for a light emitting diode. The blinker indicators 53, 54 are configured to be able to emit a light in green, for example.

The left blinker indicator 53 is configured to blink by an input from a not-shown left direction indicator. In addition, the right blinker indicator 54 is configured to blink by an input from a not-shown right direction indicator. The blinker indicators 53, 54 correspond to respective operations of the left and right blinkers. The operating states of the blinkers can be displayed by the blinker indicators 53, 54.

The upper outer-peripheral side surface 51D in the outer-peripheral side surface 51A of the meter display 50 is provided with the shift indicator (a light source for an indicator, a second light source) 55. The shift indicator 55 projects upward from the outer-peripheral side surface 51D. The shift indicator 55 includes a not-shown light source body and a lens cover part 55A that covers the light source body and transmits the light of the light source body. The light source body is constituted by an LED, for example. The shift indicator 55 is configured to be able to emit lights in a plurality of different colors, such as red, blue, and yellow, for example. The shift indicator 55 is configured to emit a light in different colors depending on the shift position of the shift gear. The state of the gear position can be displayed by the shift indicator 55.

The display screen 52 is formed with screen cutouts 52B, 52C, 52D corresponding to the arrangement positions of the indicators 53, 54, 55. When the display screen 52 is viewed from the normal direction N (see FIG. 2), the screen cutouts 52B, 52C, 52D extend along the indicators 53, 54, 55, and are each formed in a long hole-like cutout shape having a width extending toward the inside of the display screen 52. Since no image is displayed on the screen cutouts 52B, 52C, 52D and thus are dark, the lights from the indicators 53, 54, 55 can be easily visibly recognized.

Figure 6:
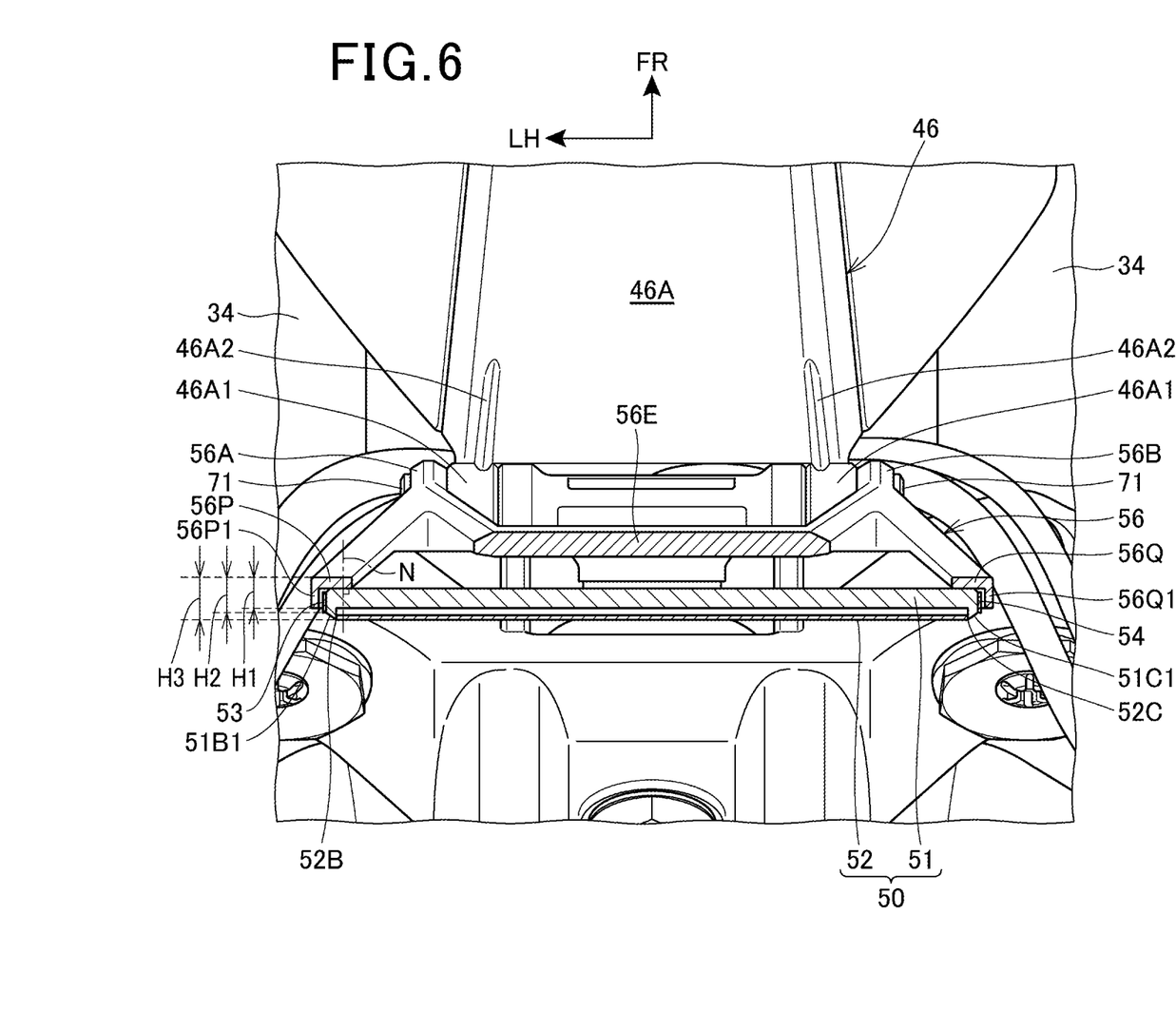
FIG. 6 is a sectional view taken along line VI-VI of FIG. 5.

FIG. 6 is a sectional view taken along line VI-VI of FIG. 5.

The outer-peripheral side surface 51B, 51C, 51D of the cover 51 is formed with cover cutouts (cutouts) 51B1, 51C1, 51D1, which are cutout in a chamfered shape and correspond to the screen cutouts 52B, 52C, 52D. That is, the cover cutouts 51B1, 51C1, 51D1 are each formed in a planar shape and inclined toward the indicators 53, 54, 55 from the display screen 52 toward outward of the display screen 52, in a longitudinal cross section. The cover cutouts 51B1, 51C1, 51D1 are located inside the opening shapes of the screen cutouts 52B, 52C, 52D, as shown in FIG. 5. The cover cutouts 51B1, 51C1, 51D1 allow the indicators 53, 54, 55 to be easily visible from the center of the vehicle. The lights from the indicators 53, 54, 55, which are propagating toward the front side of the display screen 52 of the meter display 50, are suppressed from being blocked by the outer-peripheral side surfaces 51B, 51C, 51D and thereby the displays of the indicators 53, 54, 55 can be easily seen.

Figure 7:
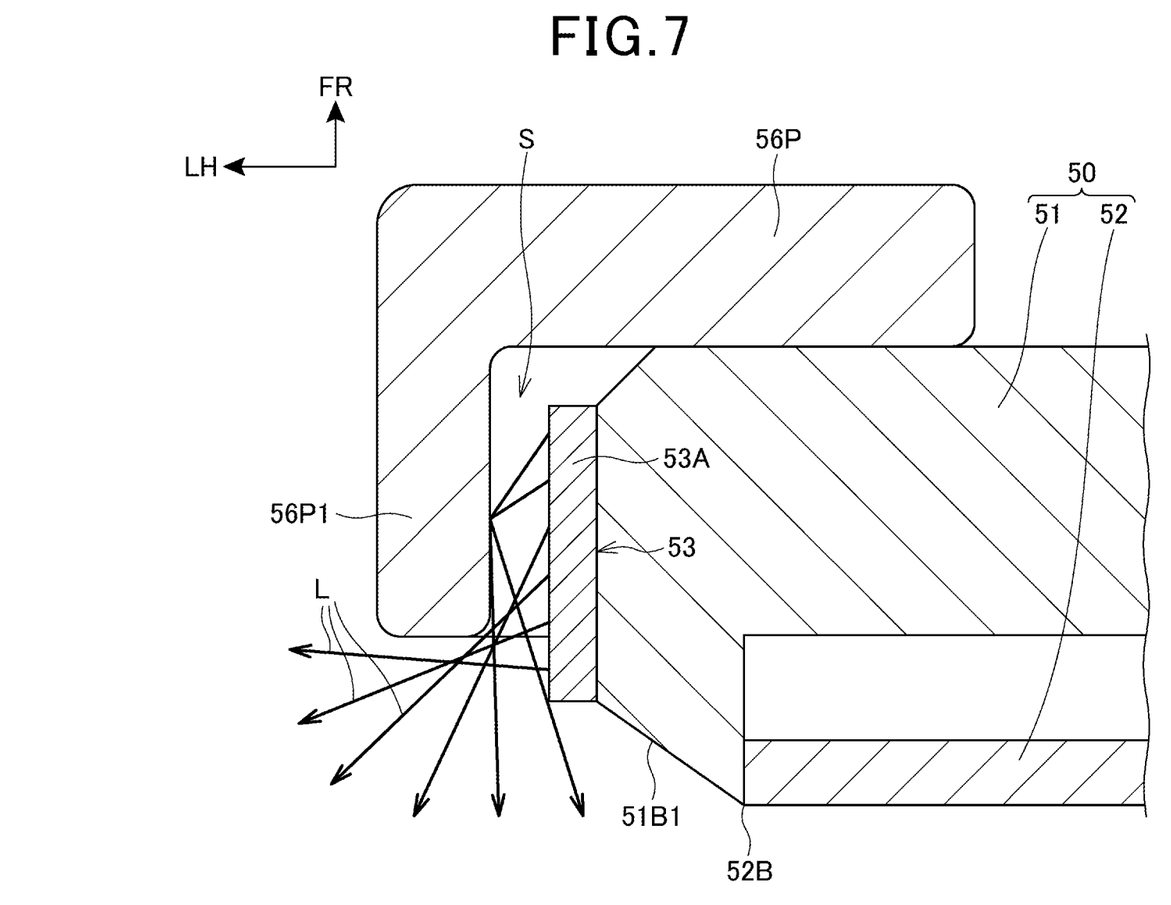
FIG. 7 is an enlarged view of the major part of FIG. 6.

FIG. 7 is an enlarged view of the main part of FIG. 6.

As shown in FIG. 5, in the meter display 50, the left blinker indicator 53 faces the left side wall body 56P1, the right blinker indicator 54 faces the right side wall body 56Q1, and the shift indicator 55 faces the upper wall body 56L1. Each of the indicators 53, 54, 55 is spaced with a predetermined gap S (see FIG. 7) with respect to each of the wall bodies 56P1, 56Q1, 56L1. Accordingly, when the indicators 53, 54, 55 emit lights, the lights L from the indicators 53, 54, 55 are reflected by the aluminum wall bodies 56P1, 56Q1, 56L1 and thereby to be easily reflected toward the near side (front side) of the display screen 52. In addition, the wall bodies 56P1, 56Q1, 56L1 hinder the lights of the indicators 53, 54, 55 to be seen from the front, left, and right sides of the saddled vehicle 10 (from others).

In particular, since the meter display 50 is provided with the cover cutouts 51B1, 51C1, 51D1, the lights reflected by the wall bodies 56P1, 56Q1, 56L1 are not blocked by the outer-peripheral side surfaces 51B, 51C, 51D of the cover 51 and are likely to propagate toward the near side of the display screen 52, which allows the driver to easily see the lights. When the indicators 53, 54, 55 are lit up, these indicates are easily visible from the rear side of the center part of the vehicle (the front side of the display screen 52), and the displays, that is, lighting and extinguishing of the indicators 53, 54, 55 are easily recognizable by the driver.

In the present embodiment, the wall bodies 56P1, 56Q1, 56L1 having a reflex function are configured as a part of the meter stay 56, and the number of components is reduced, compared with the case in which the wall bodies 56P1, 56Q1, 56L1 are separately provided.

Here, as shown in FIG. 6, heights H1, H2, H3 are defined as lengths extending rearward in the normal direction N from the mounting part 56K of the meter stay 56. At this time, the height H1 of each of the wall bodies 56P1, 56Q1, 56L1 is lower than the height H3 of the meter display 50. In addition, the height H1 of each of the wall bodies 56P1, 56Q1, 56L1 is lower than the height H2 of each of the cover cutouts 51B1, 51C1, 51D1. The height H2 of each of the cover cutouts 51B1, 51C1, 51D1 is a height of each outer peripheral edge of the cover cutouts 51B1, 51C1, 51D1, and is a height of the lowest portion thereof.

As a result, as shown in FIG. 7, the lights L of the indicators 53, 54, 55 can easily leak toward the outer periphery beyond the wall bodies 56P1, 56Q1, 56L1 to facilitate illumination of the surroundings. Therefore, by balancing the amount of the lights L of the indicators 53, 54, 55 leaking around the wall bodies 56P1, 56Q1, 56L1 with the amount of the lights L of the indicators 53, 54, 55 propagating toward the near side (front side) of the display screen 52 of the meter display 50, it is possible to facilitate recognition of the displays of the indicators 53, 54, 55, that is, recognition of lighting and extinguishing of the indicators 53, 54, 55.

The meter display 50 of the present embodiment includes the indicators 53, 54, 55 provided to the outer-peripheral side surface 51A, which is different from the display screen 52. Accordingly, it is unnecessary to display images showing the operating states of the blinkers or an image showing the state of the shift gear on the display screen 52. Hence, the display screen 52 can be reduced in dimension. In addition, information can be reduced on the display screen 52 and thereby the display screen 52 and the displays of the indicators 53, 54, 55 can be made easier to be seen.

In particular, as in the present embodiment, in the case of the meter display 50, the indicators 53, 54, 55 can be represented outside the display screen 52 of the meter display 50 and thereby the displays of the indicators 53, 54, 55 can be easier to be seen, compared with the case of displaying the indicators on the display screen 52 having no three-dimensional segments.

As described above, according to the meter structure of the present embodiment to which the present invention is applied, the meter display 50 includes the display screen 52 and includes the indicators 53, 54, 55 for the indicators on the outer-peripheral side surface 51A. According to this configuration, it is unnecessary to provide the indicators in the display screen 52 and thereby the display screen 52 can be reduced in dimension and the displays of the indicators 53, 54, 55 can be easier to be seen.

In the present embodiment, the meter display 50 is the meter display 50. Therefore, the indicators 53, 54, 55 can be represented outside the display screen 52 of the meter display 50 and thereby the displays of the indicators 53, 54, 55 can be made easier to be seen, as compared with the case of displaying the indicators on the display screen 52 having no three-dimensional segments.

In the present embodiment, the wall bodies 56P1, 56Q1, 56L1 are spaced with a predetermined gap S respectively from the indicators 53, 54, 55, and the lights L emitted by the indicators 53, 54, 55 are reflected on the wall bodies 56P1, 56Q1, 56L1. Accordingly, the displays of the indicators 53, 54, 55 can be made easier to be seen. In addition, the wall bodies 56P1, 56Q1, 56L1 hinder the lights of the indicators 53, 54, 55 from being seen from the front, left, and right sides of the saddled vehicle 10 (from others).

In addition, the present embodiment includes the meter stay 56 that supports the meter display 50, and the wall bodies 56P1, 56Q1, 56L1 are a part of the meter stay 56. Accordingly, the meter stay 56 integrally includes the wall bodies 56P1, 56Q1, 56L1; therefore, the number of components can be reduced.

In the present embodiment, the outer-peripheral side surface 51A is provided with the cover cutouts 51B1, 51C1, 51D1 corresponding to the arrangement positions of the indicators 53, 54, 55. Accordingly, the lights of the indicators 53, 54, 55, which are propagating toward the front side of the display screen 52 of the meter display 50, are suppressed from being blocked by the outer-peripheral side surface 51A, which can make the displays of the indicators 53, 54, 55 easier to be seen.

In addition, in the present embodiment, the wall bodies 56P1, 56Q1, 56L1 each have the height H1 in the normal direction N corresponding to the thickness direction of the meter display 50, and the height H1 of each of the wall bodies 56P1, 56Q1, 56L1 is lower than that of the meter display 50. Accordingly, the lights L of the indicators 53, 54, 55 can easily leak toward the peripheries of the wall bodies 56P1, 56Q1, 56L1 to facilitate illumination of the surroundings, and the displays of the indicators 53, 54, 55 can be easily recognized.

In the present embodiment, in the normal direction N corresponding to the thickness direction of the meter display 50, the height H1 of each of the wall bodies 56P1, 56Q1, 56L1 is lower than the height H2 of each of the cutouts 51B1, 51C1 and 51D1. Accordingly, by balancing the amount of the lights of the indicators 53, 54, 55 leaking toward the peripheries of the wall bodies 56P1, 56Q1, 56L1 with the amount of the lights L of the indicators 53, 54, 55 propagating toward the front side of the display screen 52 of the meter display 50, it is possible to make the displays of indicators 53, 54, 55 easier to be seen.

In addition, in the present embodiment, the indicators 53, 54, 55 include the blinker indicators 53, 54, and the blinker indicators 53, 54 are paired on the left and right and correspond to the respective operations of the left and right blinkers. Accordingly, the blinker indicators 53, 54 can display the operating states of the blinkers.

In the present embodiment, the indicators 53, 54, 55 include the shift indicator 55, and the shift indicator 55 is located on the upper outer-peripheral side surface 51D of the meter display 50 and corresponds to the gear position. Accordingly, the state of the gear position can be displayed by the shift indicator 55.

Moreover, in the present embodiment, the shift indicator 55 is lit up in different colors depending on the gear position. Accordingly, the state of the gear position can be displayed by the shift indicator 55 based on the lighting color of the shift indicator 55.

In addition, the above-described embodiment shows one aspect to which the present invention is applied, and the present invention is not limited to the above-described embodiment.

In the above-described embodiment, the case in which the meter device is constituted by the meter display 50 has been described, and the case in which the display part is constituted by the display screen 52 has been described; however, the meter device may be configured such that the display part includes a mechanical meter and the displays are performed by this mechanical meter.

In the above embodiment, it has been described that the wall bodies 56P1, 56Q1, 56L1 are integrally configured with the meter stay 56, but the wall bodies 56P1, 56Q1, 56L1 may be separate from the meter stay 56; and it may be configured that the wall bodies 56P1, 56Q1, 56L1 are assembled to the mounting part 56K, for example.

In the above embodiment, a two-wheel motor vehicle 1 has been described as an example of the saddled vehicle; however, the present invention is not limited to this; and the present invention is applicable to a three-wheel saddled vehicle having two front or rear wheels, or a saddled vehicle having four wheels or more.

REFERENCE SIGNS LIST 50 meter display (meter device)
51A outer-peripheral side surface
51B left outer-peripheral side surface
51B1 cover cutout (cutout)
51C right outer-peripheral side surface
51C1 cover cutout (cutout)
51D upper outer-peripheral side surface
51D1 cover cutout (cutout)
52 display screen (display part)
53 blinker indicator (light source for indicator, first light source)
54 blinker indicator (light source for indicator, first light source)
55 shift indicator (light source for indicator, second light source)
56 meter stay (support body)
56L1 upper wall body (wall body)
56P1 left side wall body (wall body)
56Q1 right side wall body (wall body)
H1 height of wall body
H2 height of cutout
N normal direction (thickness direction)
S gap

The invention claimed is:

1. A meter structure comprising:
a meter device as a meter display, the meter device including a cover formed in a flat disk shape, a controller housed in the cover, a display part which is a display screen on which an image processed by the controller is displayed, and a light source for an indicator on an outer-peripheral side surface of the display part,
wherein a wall body that extends along the outer-peripheral side surface is located with a predetermined gap from the light source, and a light emitted by the light source is reflected on the wall body.

2. The meter structure according to claim 1, comprising a support body that supports the meter display, and
the wall body being a part of the support body.

3. The meter structure according to claim 2, wherein the outer-peripheral side surface is provided with a cover cutout corresponding to an arrangement position of the light source.

4. The meter structure according to claim 2, wherein
the meter device has a horizontally long rectangular plate shape,
the wall body is formed on a mounting part of the support body, and
when a direction from the mounting part toward the display part of the meter device is defined as a thickness direction, a first height in the thickness direction of the wall body from the mounting part is less than a second height in the thickness direction of the meter display from the mounting part to the display part.

5. The meter structure according to claim 3, wherein
the meter device has a horizontally long rectangular plate shape,
the wall body is formed on a mounting part of the support body, and
when a direction from the mounting part toward the display part of the meter device is defined as a thickness direction, a first height in the thickness direction of the wall body from the mounting part is less than a second height of the cover cutout in the thickness direction from the mounting part to the cover cutout.

6. The meter structure according to claim 1, wherein
the light source includes a pair of a left first light source and a right first light source, and the pair of the left first light source and the right first light are provided on the outer-peripheral side surface and corresponds to respective operations of left and right blinkers.

7. The meter structure according to claim 1, wherein the light source includes a second light source, and the second light source is located on an upper outer-peripheral side surface of the outer-peripheral side surface of the meter device and corresponds to a gear position so as to display the gear position.

8. The meter structure according to claim 7, wherein the second light source is lit up in different colors depending on the gear position.

* * * * *